Dec. 29, 1953  P. G. PALMGREN ET AL  2,664,324
MULTIROW CYLINDRICAL ROLLER BEARING
WITH REMOVABLE INNER ASSEMBLY
Filed Oct. 14, 1948  2 Sheets-Sheet 1
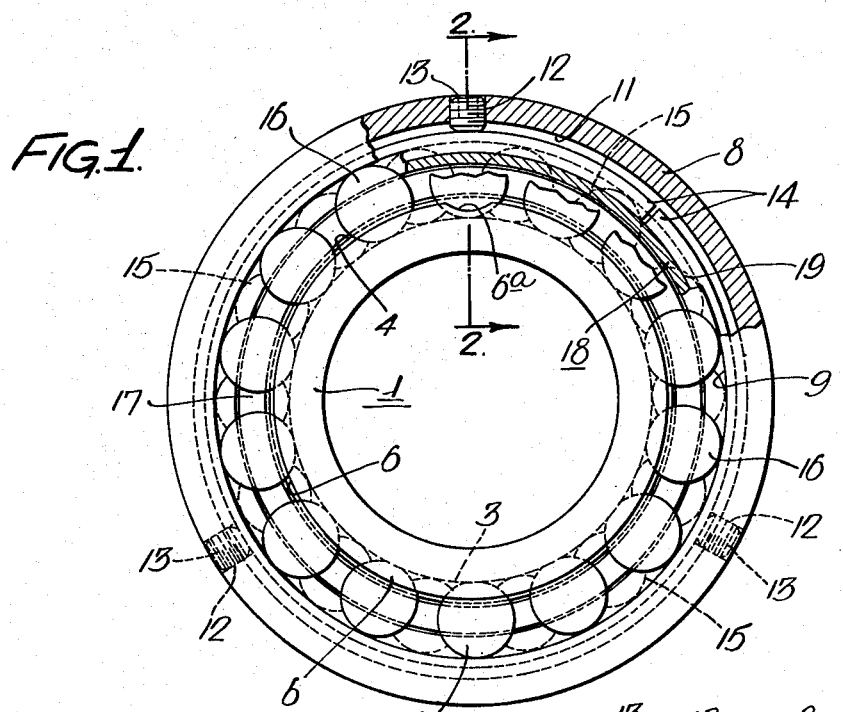
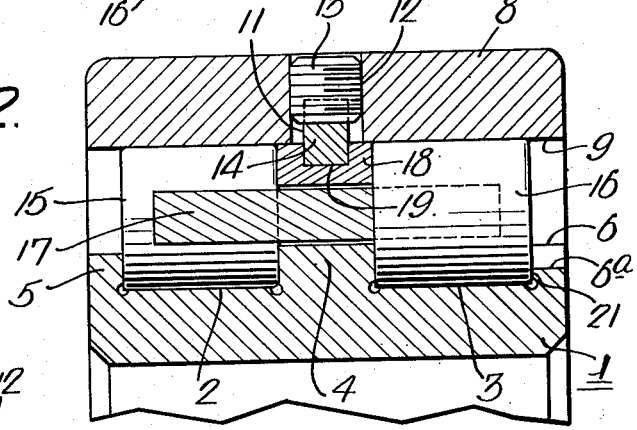
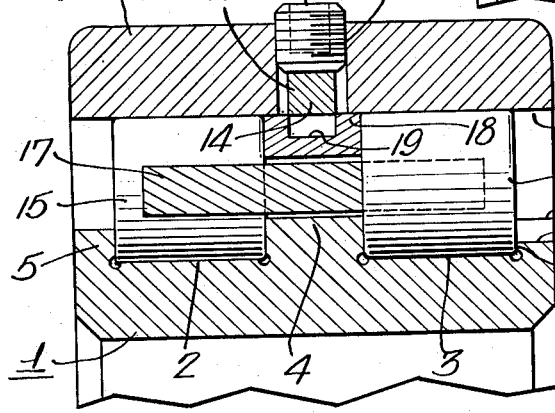
Inventors:
Per Gunnar Palmgren
Joseph Loretto Brusca
by their Attorneys
Howson &
Howson Patented Dec. 29, 1953

2,664,324

UNITED STATES PATENT OFFICE 2,664,324

MULTIROW CYLINDRICAL ROLLER BEARING WITH REMOVABLE INNER ASSEMBLY

Per Gunnar Palmgren, Philadelphia, and Joseph Loretto Brusca, Cheltenham, Pa., assignors to SKF Industries, Inc., Philadelphia, Pa., a corporation of Delaware Application October 14, 1948, Serial No. 54,524

10 Claims. (Cl. 308—213)

A principal object of this invention is to provide a multi-row cylindrical roller bearing of generally improved characteristics.

A further object of primary importance is to provide means whereby a sub-assembly consisting of the rollers and one of the races of a two-row roller bearing may be readily and detachably connected to the other race to form a unitary bearing through the medium of a device located entirely within the normal confines of said bearing.

A specific object of the invention is to provide a multi-row bearing of the unitary type containing a considerably larger number of rollers than bearings of more conventional construction with correspondingly relatively greater-load-carrying capacity.

A further object of the invention is to provide a bearing which consists in effect of an inner assembly inclusive of the inner race ring and the rollers, and an outer assembly comprising the outer race ring, together with means for positively connecting the latter ring with the said inner assembly so as to form a unitary bearing.

The invention resides also in certain novel structural devices in the assembly of elements and in certain novel structural devices thereto relating, all as hereinafter described and illustrated in the attached drawings, wherein:

Fig. 1 is an end view, partly in section, of a bearing made in accordance with the invention;

Fig. 2 is a sectional view on the line 2—2, Fig. 1;

Fig. 3 is a sectional view corresponding to Fig. 2 but showing certain of the elements in different positions of adjustment.

Figure 4:
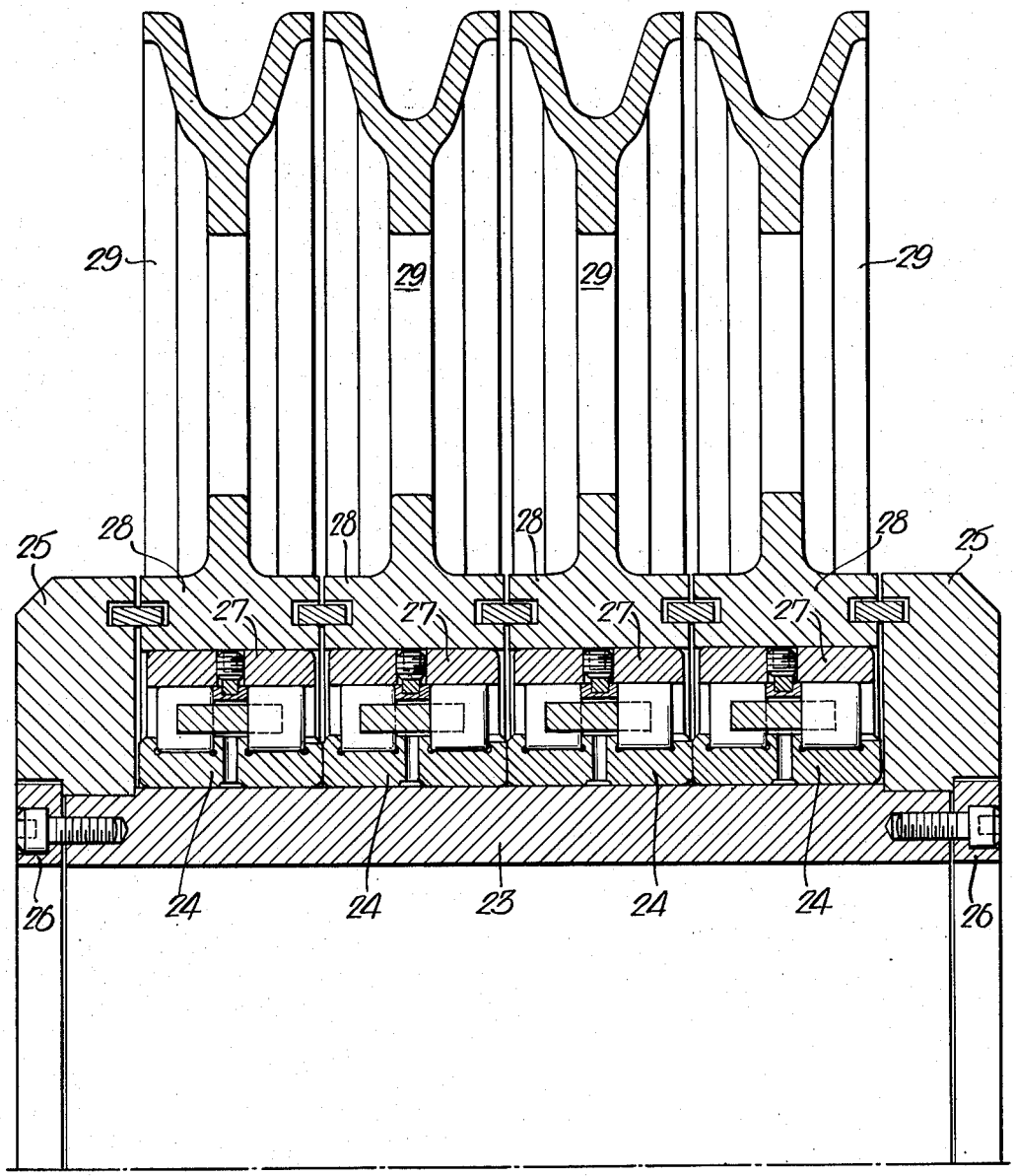
Fig. 4 is a fragmentary sectional view illustrating an important application of the principle of the invention to the mounting of sheave wheels in a block, as hereinafter more specifically described.

With reference to the drawings, the bearing therein illustrated as a preferred embodiment of the invention comprises an inner race ring 1 having two inset races 2 and 3 which are defined by a central flange or rib 4 and terminal flanges 5 and 6. The flange 6 is provided with a filling slot 6a the function of which will be hereinafter described.

The bearing further comprises an outer race ring 8 having a cylindrical inner surface 9 which is interrupted by a circumferential groove 11 midway between the ends of the ring. The outer race ring is provided also with three tapped holes 12 which intersect the groove 11, said apertures being set 120 degrees apart around the circumference of the ring and being adapted for reception of set screws 13. Seated within the groove 11 is a split resilient ring or spring element 14 which, by its inherent resiliency normally assumes a position such as shown in Fig. 3 wherein it lies entirely within the bounds of the groove leaving the inner cylindrical face 9 of the race ring unobstructed. By turning in the screws 13 the resilient ring 14 may be contracted and displaced inwardly so as to project from the groove 11 beyond the inner cylindrical face 9 of the race ring. In the present instance the groove 11 and ring 14 are rectangular in cross section, although for the purpose of the invention the groove and ring may be of other cross sectional shape if desired.

Each of the races 2 and 3 contains a row of cylindrical rollers, 15 and 16 respectively; and a cage 17 rides with a close fit upon the land of the rib 4 and functions to space the rollers of the respective rows uniformly in the respective race. Surrounding the cage 17 between the rows of rollers 15 and 16 is solid annular member 18 corresponding substantially in dimensions to the rib 4 and this member 18 has an external circumferential groove 19 which registers with the groove 11 of the outer race ring 8 and which corresponds in width with the latter groove. In assembly the split ring 14 projects into the groove 19, as shown in Fig. 2, and thereby acts to unite the outer race ring 8 with the inner assembly consisting of the inner race ring 1, the rollers 15 and 16, the cage 17 and the member 18.

The manner in which the bearing is assembled is as follows:

The full complement of rollers is placed in the race 2. The cage 17 is then slid into position over the race ring 1 and into a normal cooperative relation with the rollers 15. The member 18 is then slid into place around the body of the cage 17 and thereafter the rollers 16 are inserted in the race 3 and within the cage pockets, such insertion being provided for by the filling slot 6a. The filling slot 6a is provided with a substantial dam 21 so that when the rollers 16 have been inserted the elements thus brought together constitute an inner assembly which will remain intact for handling as a unit.

This inner assembly is now passed into position within the outer race ring 8 and is united with this ring, as previously described, by advancing the screws 13 to thereby force the split ring 14 into the groove 19 of the ring 18. The ring 14, projecting in part into the groove 19 and in part into the groove 11 of the outer race ring 8, acts as a lock to positively connect the outer race with the inner assembly.

It will be apparent that whereas the assembled bearing has the unitary characteristics of a bearing wherein both the inner and outer race rings are provided with roller retaining flanges, it is possible, by reason of the aforedescribed construction, to include a considerably larger number of rollers, approximately 50 per cent more, than in bearings employing the "Conrad method" of assembly. The additional rollers afford greater load-carrying capacities.

An important characteristic of the invention resides in the fact that the relatively great load-carrying capacity is obtained with maintenance of minimum outside dimensions for the bearing. The ring 18 which unites the elements of the bearing into the unitary assembly is located entirely within the normal minimum confines of the bearing structure, and occupies an otherwise unoccupied annular space which is inherently present in the use of the central cage 17 and central flange 4 of the inner race. The device, therefore, entails no increase in any of the normal outside dimensions of the bearing.

The significance of this feature of the invention will be appreciated by reference to Fig. 4. The sheave block therein illustrated is of a character employed in oil well rigs which are required to lift extremely heavy loads in and out of wells of great depth. It is essential that blocks used for such purpose shall not only have maximum load-carrying capacity, but shall be in addition of minimum overall size for use in highly restricted confines. As shown in Fig. 4, the block consists of a hollow shaft 23 upon which are mounted four cylindrical roller bearings having inner races 24 butted together and clamped endwise between flange elements 25, 25 which are clamped on the respective ends of the shaft by retaining rings 26. The outer races 27 of the bearings are somewhat shorter in axial length than the inner races 24, but with this exception the bearings correspond in principle of construction to the bearings illustrated in the preceding figures and described above. The outer race 27 of each of the bearings goes with an interference fit into the hub 28 of a sheave wheel 29 so that the respective wheels are permanently connected to the said outer races and are held in position as shown with slight clearances between them.

It will be apparent, by reason of the fact that the bearings possess not only the required high load-carrying capacities, but also a minimum length, that the axial length of the assembly is reduced to a minimum by use of bearings which also afford maximum load-carrying capacity.

It is to be noted that the invention is not limited in its application to multi-row bearings of the two rows only, and that the embodiment of the invention illustrated in the drawings is subject to modification in detail without departure from the principles of the invention as defined in the appended claims.

We claim:

1. A multi-row roller bearing comprising an inner race ring having a plurality of inner races, rollers in said races, an outer race ring having unobstructed cylindrical inner roller-engaging surfaces, a continuous annular member embracing said inner ring between two adjoining rows of rollers, and means radially adjustable in the outer ring for releasably locking said ring to the annular member.

2. A multi-row roller bearing comprising an inner ring having a plurality of inner races, rollers in said races, an outer race ring having an unobstructed cylindrical inner roller-engaging surface, an annular member embracing said inner ring between two joining rows of rollers, and means radially adjustable in the outer ring for releasably locking said ring to the annular member, said locking means comprising an element normally housed within the outer ring and means for projecting said element into a recess in said member.

3. A bearing according to claim 2 wherein the said element consists of a resilient split annulus normally expanded by its inherent resiliency into a recess in the inner cylindrical surface of the outer ring.

4. A bearing according to claim 3 wherein the means for projecting the said element consists of a plurality of screws in the outer ring engageable with the outer periphery of the split annulus when turned inwardly so as to displace the annulus into the recess in the annular member.

5. A multi-row roller bearing comprising an inner race ring, a plurality of rows of rollers axially confined in races in said ring; cage means having cylindrically recessed pockets for the rollers preventing radial displacement of the rollers from the races; an annular member embracing the ring between adjoining rows for engagement with the confronting faces of the rollers of said rows; said inner ring, rollers, cage means and annular member forming a unitary inner assembly; an outer race ring within which said inner assembly is insertable axially; and means for releasably connecting the outer ring to the annular member of said inner assembly so as to preclude axial displacement of the outer ring with respect to said assembly.

6. A multi-row roller bearing comprising an inner race ring, a plurality of rows of rollers axially confined in races in said ring, cage means preventing radial displacement of the rollers from the races, an annular member embracing the ring between adjoining rows of rollers for engagement with the confronting faces of the rollers of said rows, said inner ring, the rollers, the cage means, and the annular member forming a unitary inner assembly, an outer race ring within which said inner assembly is insertable axially, means for releasably connecting the outer ring to the annular member of said inner assembly so as to preclude axial displacement of the outer race ring with respect to said assembly, said connecting means including a circumferential groove in the outer surface of the annular member, and an element carried by the outer race ring and adjustable to alternative positions in one of which the element projects into said groove in the annular member and in the other of which the said element is retracted from said groove.

7. A bearing according to claim 6 wherein the adjustable element consists of a split ring mounted in a circumferential groove in the inner surface of the outer race ring and wherein adjustable means are provided in said race ring for engagement with the outer surface of said split ring to adjust the latter inwardly so as to project in part into the groove of said annular member.

8. A multi-row roller bearing comprising an inner race ring having a circumferential rib separating adjoining races, rollers in said races forming adjoining rows, a common cage for said rollers closely fitting and guided by said rib, said cage having cylindrically recessed pockets for the rollers preventing radial displacement of the rollers from the races, an annular member embracing the cage between the said rows of rollers for engagement with the confronting faces of the rollers, an outer race ring, said inner ring, rollers, cage and annular member forming an inner assembly insertable as a unit in the outer ring from one end of the latter, and means for releasably connecting the outer ring to the annular member of said inner assembly to thereby form a unitary self-contained bearing.

9. A multi-row roller bearing comprising inner and outer race rings of which one is provided with a plurality of inner races, rollers in said races, the other of said rings having an unobstructed cylindrical roller-engaging surface, a continuous annular member located between two adjoining rows of rollers in proximity to the roller-engaging surface of the last named ring, and means radially adjustable in said ring for releasably locking the ring to the annular member.

10. A bearing according to claim 9 wherein the surface of said annular member which confronts the unobstructed cylindrical roller-engaging surface of the proximate ring is recessed for reception of the said radially adjustable means for releasably locking the said ring to the member.

PER GUNNAR PALMGREN.
JOSEPH LORETTO BRUSCA.

References Cited in the file of this patent

UNITED STATES PATENTS

| Number | Name | Date |
|---|---|---|
| 892,866 | Moonen | July 7, 1908 |
| 1,178,526 | Laycock | Apr. 11, 1916 |
| 1,995,571 | Lott | Mar. 26, 1935 |